Feb. 6, 1951 M. FLEISCHER 2,540,872
DISK SLIDE TRANSPARENCY PROJECTOR
Filed July 21, 1948 2 Sheets-Sheet 2
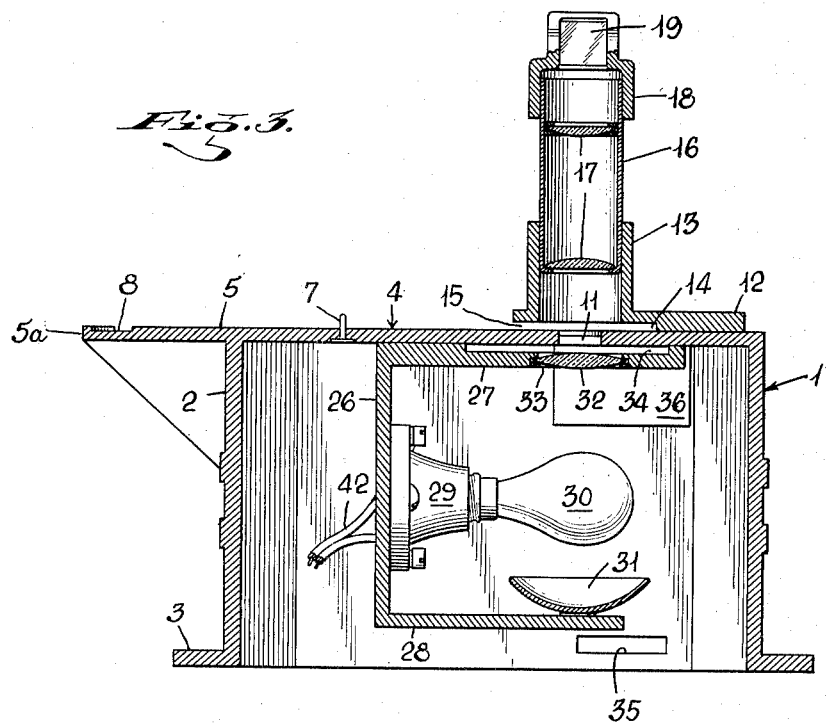
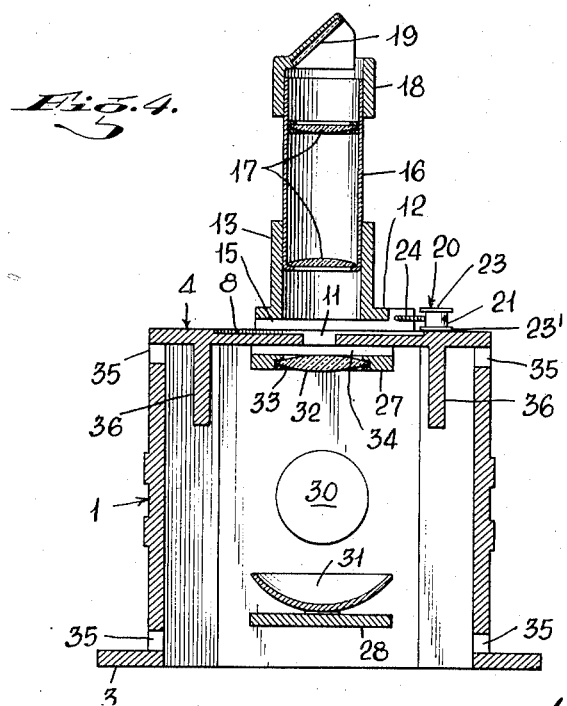
INVENTOR
Max Fleischer
BY Henry I. Horridge
ATTORNEY Patented Feb. 6, 1951

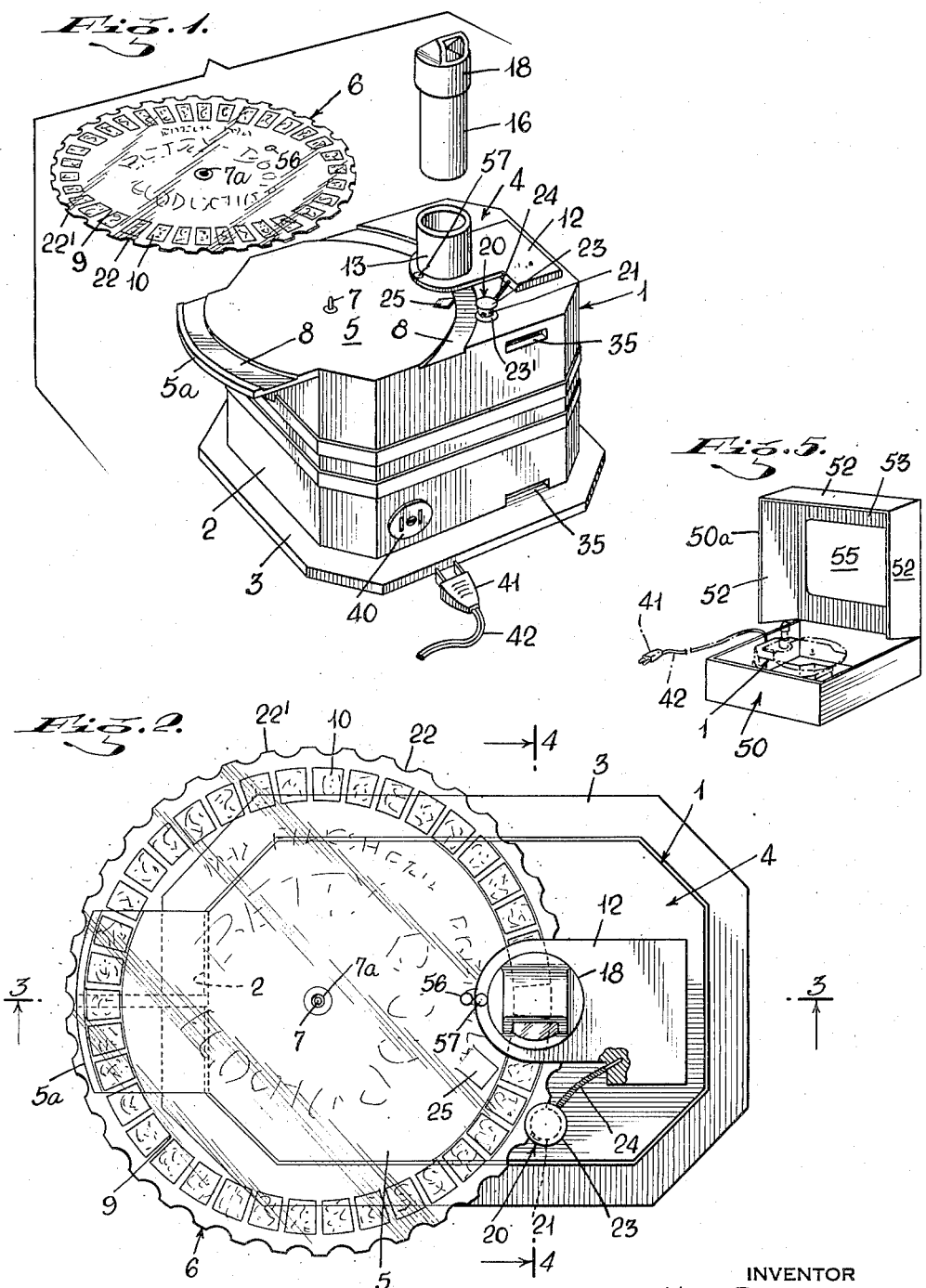

2,540,872

UNITED STATES PATENT OFFICE 2,540,872

DISK SLIDE TRANSPARENCY PROJECTOR

Max Fleischer, New York, N. Y.

Application July 21, 1948, Serial No. 39,900

7 Claims. (Cl. 88—27)

1

This invention relates to a slide transparency projector of the type with which a disk is employed as the carrier of the transparencies.

The principal object of my invention is to provide such a projector of the utmost simplicity in construction and operation which reduces to a minimum the use of mechanically operated parts or members, and which is compact, light, easily portable and inexpensive to make.

Another object of my invention is to provide a projection screen on a portion of the container of the projector which may be used without removing the projector from the container and having a predetermined correct relationship to the lens system of the projector.

Another object of my invention is to protect the picture portion of the disk carrier against scratching or other injury while in use.

Another object is to eliminate the need for pilot lights and to enable the projection lamp at all times during projection to provide the light needed by the operator without interference with the projection.

These and other advantages will appear from the following description of the invention in connection with the drawings, in which:

Fig. 1 is an exterior perspective view of the projector with the disk transparency carrier and lens barrel shown in detached relationship to their respective operating positions;

Fig. 2 is an exterior plan view of the projector with the disk in operating position;

Fig. 3 is a vertical section taken along the lines 3—3 of Fig. 2 looking in the direction of the arrows;

Fig. 4 is a vertical section taken along the lines 4—4 of Fig. 2 looking in the direction of the arrows, and Fig. 5 is a perspective view of the container of the projector with the latter indicated therein.

Referring to the drawings, 1 indicates the projector housing, consisting of a box having side walls 2 provided with horizontal flanges 3 and a top 4, the bottom however, being open, and preferably made of a translucent plastic.

Top 4 of the housing provides a supporting table for the disk and for the lens barrel mount. Inside the box are mounted the projecting lamp socket 29 with its lamp 30, reflector 31 and condenser 32.

5 indicates the portion of top 4 which serves as the table for disk 6. A spindle 7 is mounted at the center of table 5 upon which disk 6 is mounted for rotation, disk 6 having a central hole 7a for the purpose.

2

The portion of table 5 which underlies the marginal picture band 9 of disk 6 when the latter is in operating position, is recessed or grooved, indicated at 8, whereby the picture band 9 is kept out of contact with table 5. The pictures 10 carried by disk 6 are supported or formed on the underside of disk 6 and hence are subject to possible scratching or other injury if precaution is not taken to prevent it.

While I prefer the formation of a groove 8 in the table 5 for this purpose, a similar result may be obtained in other ways; for instance table 5 may be made of sufficiently smaller diameter than the disk so that the picture band 9 of the disk will overhang table 5, or the groove 8 could be made very much wider than as shown in the drawings.

Table 5 has an overhanging extension 5a formed with an arcuate edge concentric with the arc of disk 6.

Disk 6 is preferably made of transparent or translucent material such as is presently available in well known plastics. The subjects 10 to be projected, broadly referred to herein as pictures, may be separate photographic or other transparencies, or imprints directly imposed upon the surface of disk 6, and may be pictures in the common sense, or texts, or a combination of both. If separate transparencies are employed they may be secured to disk 6 by an adhesive.

Pictures 10 are arranged on disk 6 in the manner shown in Figs. 1 and 2, radially, in the circular band 9.

Projection aperture 11 is formed in groove 8 of table 5 (Figs. 3, 4).

A lens barrel mount comprising a base 12 and a socket 13 is secured to top 4 so that socket 13, which is open at the bottom, is in axial alignment with aperture 11.

Socket 13 and the adjacent portion of base 12 of the lens barrel mount are spaced from table 5, as indicated at 15, base 12 being grooved at 14 to accomplish this in order to accommodate the portion of disk 6 which will extend beneath socket 13 and said adjacent portion of base 12, when disk 6 is in operating position, groove 15 affording sufficient clearance for disk 6.

Lens barrel 16 contains the usual projecting lens objective 17 and a fixed cap 18 at its upper end in which a mirror 19 is mounted at an angle of 45° to the axis of lens 17 to change the direction of the projected image from the perpendicular to the horizontal. Lens barrel 16 is telescopically adjustable in socket 13 for focussing.

The edge of disk 6 is serrated, the arcuate recesses being indicated as 22, and the high points between as 22'.

Instead of supporting disk 6 on a horizontal table 5 which requires changing the path of the projected beam from the vertical to a horizontal direction, housing 1 may be constructed so as in effect to turn it on its side 2, which will become the bottom. Top 4 with its table 5 and extension 5a will thus be in a vertical plane, and lens barrel 16 and socket 13 in a horizontal position. In this changed construction, the projected beam will be horizontal and mirror 19 will be eliminated.

A brake 20 of spool form, having a cylindrical post 21 the arc of which is the same as the arc of recesses 22 of disk 6, is kept under tension against the edge of disk 6 when the latter is in operating position, by spring 24 secured to it and anchored in lens barrel support 12. Recesses 22 are radially aligned with pictures 10. When disk 6 is placed in operating position over spindle 7, a portion of its edge will be interposed between the upper and lower disks 23, 23' of brake 20, as seen in Fig. 2. It is not necessary that the brake 20 be of spool form, although I prefer that form. For instance, disks 23, 23' could be eliminated, or the brake could be an integral part of spring 24. A wedge 25 (Fig. 1) is mounted on table 5 close to the inner edge of groove 8 to raise the marginal portion of disk 6 to clear lower disk 23' of brake 20.

A bracket, having side 26, top 27 and bottom 28 is secured within casing 1, to the underside of top 4. Lamp socket 29 is mounted on side 26, and reflector 31 on bottom 28. Condenser 32 is mounted in aperture 33 of top 27, in axial alignment with aperture 11 and projecting objective 17. Top 27 is recessed at 34 to provide an air space about condenser 32 to permit circulation of air above it. Casing 1 is provided with ventilating openings 35.

Vertical screens 36 (Fig. 4) secured to top 4 of casing 1 serve to screen the adjacent ventilating apertures 35 from the light of projecting lamp 30. Lamp socket 29 is electrically wired to receptacle 40 (Fig. 1), which may be connected to the house current by plug 41 and its associated cable 42 or receptacle 40 may be omitted and cable 42 may be directly connected to socket 29 as shown in Fig. 5.

Casing 1, with lens barrel 16 removed, snugly fits in its container 50 (Fig. 5) which has a hinged cover 50a comprising sides 52 and top 53. A projection screen 55 is painted or otherwise produced on the underside of the top 53.

When cover 50a is raised to a perpendicular position, screen 55 is correctly positioned to receive the projected enlargement of the pictures 10 on disk 6 when the projector is within the container 50 and projecting objective 17 is properly focussed. If projection is desired to be confined to the screen 55, the focussing adjustment of lens barrel 16 within tubular member 13 could be facilitated by providing registering markings on lens barrel 16 and tubular member 13 to furnish the exact position, or by providing a lens barrel 16 which would take a set position in tubular member 13 by any well known means.

Sides 52 of cover 50a furnish, in connection with top 53, a shadow box which excludes confusing light from sources other than the projecting light.

Lamp socket 29 may be connected to batteries, instead of the house current, if desired.

It is contemplated that the voltage of the house current, when employed, should be reduced, and cable 42 may be formed of well known resistance wires to accomplish this reduction, without the necessity of a transformer.

An index mark 57 is formed on base 12 of the lens barrel mount, and a like mark 56 on disk 6 so that when these marks are in radial alignment, disk 6 will be in its proper starting position with the first picture 10 to be projected, directly over aperture 11.

The operation of the projector is extremely simple.

Disk 6 is placed over table 5 with a marginal portion extending into groove 15 of base 12 of the lens barrel mount and against brake 20. The flexibility of disk 6 will enable it to be flexed and mounted, by central hole 7a, over spindle 7 and the spring of disk 6 in this flexed position will force brake 20 outwardly until disk 6 lies flat on table 5. Disk 6 is then rotated by hand until registering marks 56, 57 are in radial alignment.

As seen in Fig. 2, disk 6 is movable, owing to the positioning of spring 24, only clockwise.

After disk 6 is placed in operating position over spindle the projecting lamp is plugged into the current source, whether battery or house current, and assuming that the projector is kept within its container 50, the cover 50a of the latter is raised to a vertical position, lens barrel 16 is placed in tubular member 13, and adjusted to produce good definition, and such lateral adjustment of lens barrel 16 as may be necessary is made to frame the projection on screen 55. No vertical framing adjustment will be necessary.

Looking at Fig. 2 in the reverse direction of arrows 3, the operator will station himself behind the projector and with the thumb of his right hand will draw the disk to him, one recess 22 at a time, while some of the other fingers of that hand will engage the underside of extension 5a, thereby steadying and facilitating the action, and his left hand will hold down flange 3 at the opposite end of casing 1 to prevent movement of casing 1.

In this movement of disk 6, recess 22 by recess 22, brake 20 is forced out of the recess, rides the high portion 22' and snaps into the next recess, stopping disk 6 at that place, of which the operator is instantly aware and ceases moving disk 6 until the picture 10 corresponding to that recess has been projected the desired length of time.

Disk 6 is removed simply by taking it off spindle 7 and withdrawing it from groove 15. The operations of loading and unloading disk 6 each takes but a few seconds.

If desired the projector can be removed from its container 50 and projection can be made on any suitable screen other than screen 55. Translucent housing 1 transmits the light needed by the operator, lamp 30 serving both as a projection lamp and as a pilot light.

Changes other than those hereinbefore indicated in the embodiment of my invention shown in the drawings may be made without departing from the spirit or scope of my invention, which is defined in the appended claims.

I claim:

1. A projector for disk transparency slides wherein the picture transparencies are arranged in a circular band, comprising a housing, a support for said disk forming part of the housing and projecting therefrom, a spindle mounted on said support, a groove in the portion of said support opposed to the picture band of said disk when the latter is mounted on said spindle whereby the picture band portion of said disk will not contact said support, a projection aperture in said support in registry with the picture band of said disk when the latter is mounted as aforesaid, a lens barrel containing a projection objective, a mount for said lens barrel mounted on said support and extending over said groove but spaced from said support to permit the said disk to pass beneath it, a spring pressed brake continuously engaging the edge of said disk when the latter is mounted as aforesaid, the spring whereof being anchored in said lens barrel mount, a condenser and electric lamp mounted within said housing and means for connecting said lamp with a source of electrical energy.

2. The combination of a translucent disk slide carrying a series of transparent pictures arranged in a circular band, the edge of said disk having a series of arcuate recesses corresponding to and radially aligned with the said pictures, and a projector comprising a housing, a support for said disk forming part of the housing and projecting therefrom, a spindle mounted on said support, a groove in the portion of said support opposed to the picture band of said disk when the latter is mounted on said spindle whereby the picture band portion of said disk will not contact said support, a projection aperture in said support in registry with the picture band of said disk when the latter is mounted as aforesaid, a lens barrel containing a projection objective, a mount for said lens barrel mounted on said support and extending over said groove but spaced from said support to permit the said disk to pass beneath it, a spring pressed brake continuously engaging the edge of said disk when the latter is mounted as aforesaid, the spring whereof being anchored in said lens barrel mount, a condenser and electric lamp mounted within said housing and means for connecting said lamp with a source of electrical energy.

3. The combination of a translucent disk slide carrying a series of transparent pictures arranged in a circular band, the edge of said disk having a series of arcuate recesses corresponding to and radially aligned with the said pictures, and a projector comprising a translucent housing, a support for said disk forming part of the housing and projecting therefrom, a spindle mounted on said support, a groove in the portion of said support opposed to the picture band of said disk when the latter is mounted on said spindle whereby the picture band portion of said disk will not contact said support, a projection aperture in said support in registry with the picture band of said disk when the latter is mounted as aforesaid, a lens barrel containing a projection objective, a mount for said lens barrel mounted on said support and extending over said groove but spaced from said support to permit the said disk to pass beneath it, a spring pressed brake anchored in said lens barrel mount continuously engaging the edge of said disk when the latter is mounted as aforesaid, the disk edge engaging portion of said brake being curved to fit the said recesses of said disk, a condenser and electric lamp mounted within said housing and means for connecting said lamp with a source of electrical energy.

4. The combination of a translucent disk slide carrying a series of transparent pictures arranged in a circular band, the edge of said disk having a series of arcuate recesses corresponding to and radially aligned with the said pictures, and a projector comprising a translucent housing, a support for said disk forming part of the housing and projecting therefrom, a spindle mounted on said support, a groove in the portion of said support opposed to the picture band of said disk when the latter is mounted on said spindle whereby the picture band portion of said disk will not contact said support, a projection aperture in said support in registry with the picture band of said disk when the latter is mounted as aforesaid, a lens barrel containing a projection objective, and a 45 degree reflecting surface in front of said objective, vertically mounted in a mount secured to said support and extending over said groove but spaced from said support to permit the disk to pass beneath it, a spring pressed brake anchored in said lens barrel mount continuously engaging the edge of said disk when the latter is mounted as aforesaid, the disk edge engaging portion of said brake being curved to fit the said recesses of said disk, a condenser and electric lamp mounted within said housing and means for connecting said lamp with a source of electrical energy.

5. The combination of a translucent disk carrying transparent pictures radially arranged in a band on a marginal portion of said disk, the edge of said disk having a series of recesses corresponding to the number of pictures thereon in radial alignment therewith, and a projection device comprising a translucent housing open at the bottom, having a top with an overhanging portion at one side, providing a table for said disk, a spindle mounted on said top, the extent of overhang of said overhanging portion being such that the recessed portions of the disk will extend slightly beyond said overhang when the disk is placed in pivotal position over the spindle, a circular groove in the top corresponding to but slightly wide than the picture band on the disk when the latter is in the last named position, a projection aperture in the groove in said top at the end opposite the overhanging portion, a lens barrel mount comprising a base secured to said top outside said groove, a portion of said base extending across said groove over said aperture but spaced from the top, said portion carrying a vertically mounted tubular socket, a brake for the disk of spool-like construction, a spring anchored in said base and secured to said spool normally keeping said spool in engagement with the recesses of said disk, a lens barrel containing a projection objective and a 45 degree mirror in front of said objective, telescopically mountable within said tubular socket, a condenser, an electric projection lamp and a reflector mounted within said housing below and in registry with said aperture and means electrically connecting said lamp with a source of electrical energy.

6. The combination of a disk slide carrying a series of transparent pictures arranged in a circular band, the portions of said disk in registry with said pictures being capable of permitting the transmission therethrough of a projection of said pictures, the edge of said disk having a series of arcuate recesses corresponding to and radially aligned with said pictures, and a projector comprising a translucent housing, a support for said disk secured to and projecting from said housing, a spindle mounted on said support, a projection aperture in said support in registry with the picture band portion of said disk when the latter is mounted on said spindle, a lens barrel containing a projection objective, a mount for said lens barrel extending over said projection aperture and support but spaced from the latter to permit said disk to pass beneath it, the portion of said support in the vicinity of said projection aperture being spaced from said disk whereby the picture band portion of said disk will not contact said support, a spring pressed brake anchored in said lens barrel mount continuously engaging the edge of said disk when the latter is mounted as aforesaid, the disk edge engaging portion of said brake fitting said recesses of said disk, a condenser and electric projecting lamp mounted within said housing, and means for connecting said lamp with a source of electrical energy.

7. The combination of a disk slide carrying a series of picture transparencies arranged thereon in a circular band and to be projected upon a reflecting surface, the rim of said disk having a series of recesses corresponding to and radially aligned with said picture transparencies, and a projector comprising a translucent housing, a support for said disk secure to said housing and having a flat disk contacting surface, a spindle for said disk fixedly secured to said support, said disk being mounted on said spindle for rotation thereon by hand, said disk contacting surface of said support being confined to an area lying wholly inside of the picture band portion of said disk when the latter is mounted as aforesaid, a projection aperture in said housing, a lens barrel containing a projection objective, a mount for said lens barrel extending over and spaced from said projection aperture to permit the picture band portion of said disk to pass between said lens barrel mount and projection aperture when said disk is mounted as aforesaid, a spring pressed brake continuously engaging the rim of said disk when the latter is mounted as aforesaid, and means mounted on said disk support for raising the marginal portion of said disk in the space between said projection aperture and said lens barrels mount when said disk is mounted as aforesaid, an electric lamp within said housing and means for connecting said lamp with a source of electrical energy.

MAX FLEISCHER.

REFERENCES CITED

The following references are of record in the file of this patent:

UNITED STATES PATENTS

| Number | Name | Date |
| --- | --- | --- |
| 682,416 | Matthews | Sept. 10, 1901 |
| 728,655 | Barnes | May 19, 1903 |
| 1,019,932 | Victor | Mar. 12, 1912 |
| 1,313,241 | Ashley | Aug. 19, 1919 |
| 1,446,999 | Whitehead | Feb. 27, 1923 |
| 1,584,708 | Billing | May 11, 1926 |
| 1,696,831 | Baker | Dec. 25, 1928 |
| 2,311,056 | Langberg | Feb. 16, 1943 |
| 2,425,217 | Wienke | Aug. 5, 1947 |

FOREIGN PATENTS

| Number | Country | Date |
| --- | --- | --- |
| 479,748 | Great Britain | Feb. 8, 1928 |